United States Patent [19]

Richard, Jr.

[11] Patent Number: 5,102,978

[45] Date of Patent: Apr. 7, 1992

[54] COPOLYESTER

[75] Inventor: Robert E. Richard, Jr., Akron, Ohio

[73] Assignee: The Goodyear Tire & Rubber Company, Akron, Ohio

[21] Appl. No.: 653,467

[22] Filed: Feb. 11, 1991

Related U.S. Application Data

[63] Continuation of Ser. No. 509,525, Apr. 16, 1990, abandoned.

[51] Int. Cl.$^5$ ............................................. C08G 63/685
[52] U.S. Cl. ................................. 528/272; 528/289; 528/292; 528/302; 528/308.6; 528/310; 528/322
[58] Field of Search ............... 528/272, 289, 292, 302, 528/308.6, 310, 322

[56] References Cited

U.S. PATENT DOCUMENTS

| | | |
|---|---|---|
| 4,358,561 | 11/1982 | Keske et al. ..................... 524/600 |
| 4,861,857 | 8/1989 | Kricheldorf et al. ............... 528/170 |

FOREIGN PATENT DOCUMENTS

| | | |
|---|---|---|
| 63-92651 | 4/1988 | Japan . |
| 63-272635 | 11/1988 | Japan . |
| 63-277235 | 11/1988 | Japan . |
| 1123819 | 5/1989 | Japan . |
| 1129015 | 5/1989 | Japan . |

OTHER PUBLICATIONS

CA111(20):174926g. "Tough Polyester-Polyimides and Their Manufacture".
CA110(22)194558w "Polyesters for Fibers, Films, and Engineering Plastics".
CA107 (20): 176743m "Fully-aromatic, Mesomorphic Polyester-Polyamide-polyimide".
CA73(15): 76907d "Diimides as UV Stabilizers and Antioxidants".
Murakami et al., "Polyesters for Fibers, Films and Engineering Plastics", CA110(22):194558w.
Hisgen et al., "Fully-aromatic, Mesmorphic Polyester-Polyamide-Polyimide", CA107(20): 176743m.

Primary Examiner—John Kight, III
Assistant Examiner—Sam A. Acquah
Attorney, Agent, or Firm—Alvin T. Rockhill

[57] ABSTRACT

It has been determined that the glass transition temperature of polyesters can be increased by incorporating certain imide-containing diacid monomers therein. This invention specifically discloses a copolyester which is comprised of repeat units which are derived from (a) a diol component and (b) a diacid component which is comprised of (1) from about 1 to about 15 mole percent of at least one imide-containing diacid monomer having the structural formula:

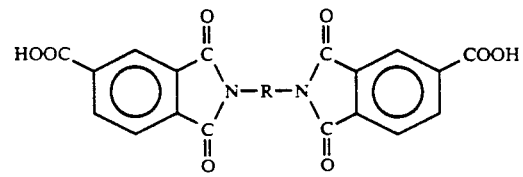

wherein R represents an alkylene group, a substituted alkylene group, an arylene group, or a substituted arylene group, and (2) from about 85 to about 99 mole percent terephthalic acid or a diester thereof. N,N'-bis(1,3-methylene) cyclohexane bis-(trimellitimide) is a highly preferred imide-containing diacid monomer which can be utilized in making the polyesters of this invention.

12 Claims, No Drawings

COPOLYESTER

This is a continuation of copending applications Ser. No. 07/509,525 filed on Apr. 16, 1990, now abandoned.

BACKGROUND OF THE INVENTION

Polyethylene terephthalate homopolymer (PET) has succeeded as a replacement for glass in many applications. The success of PET as a glass replacement is attributable to a large extent to the fact that it is very light weight and will not normally break and shatter on impact. PET also offers good carbon dioxide and oxygen barrier resistance and can accordingly be utilized in carbonated beverage bottles. Bottles, jars and cans which are made from PET are currently being utilized as containers for a wide variety of food products and beverages. However, PET containers are not suitable for some food products which must be packed utilizing hot-fill techniques. This is because containers made from PET can become thermally unstable above the glass transition temperature of the PET (about 74° C.).

Heat-setting techniques can be utilized to enhance the thermal stability of PET containers. By utilizing heat-setting techniques, the service temperature of PET articles can be increased to about 80° C. This allows for such heat-set PET containers to be utilized in certain hot-fill applications which would not otherwise be possible. For instance, heat-set PET containers can be hot-filled with fruit juice which would not be possible if the container was not heat-set. Even though heat-setting is effective for increasing the service temperature of PET containers, the cost associated with the heat-setting procedure is very substantial.

SUMMARY OF THE INVENTION

It has been discovered that certain imide-containing diacid monomers can be utilized to modify polyesters to increase their glass transition temperature. This modification is accomplished by copolymerizing the imide-containing diacid monomer into the polyester as a monomeric repeat unit. In other words, the imide-containing diacid monomer is polymerized into the polyester as an additional component along with the diacid component and the diol component.

By increasing the glass transition temperature of the polyester, containers made therefrom will have a higher service temperature at which they will remain dimensionally stable. Thus, containers made utilizing such modified polyesters can be hot-filled at higher temperatures. It is also possible to heat-set containers made with such modified polyesters to further increase the service temperature thereof.

The present invention specifically relates to a copolyester which is comprised of repeat units which are derived from (a) a diol component and (b) a diacid component which is comprised of (1) from about 1 to about 15 mole percent of at least one imide-containing diacid monomer having the structural formula:

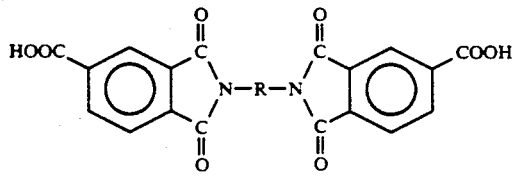

wherein R represents an alkylene group, a substituted alkylene group, an arylene group, or a substituted arylene group, and (2) from about 85 to about 99 mole percent terephthalic acid or a diester thereof.

The present invention also reveals a process for preparing a copolyester having a high glass transition temperature which comprises copolymerizing (a) at least one diol component and (b) a diacid component which is comprised of (1) from about 1 to about 15 weight percent of at least one imide-containing diacid monomer having the structural formula:

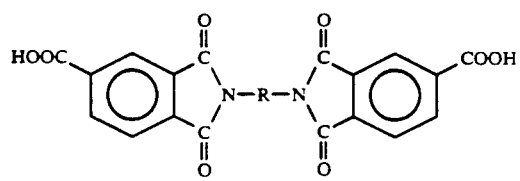

wherein R represents an alkylene group, a substituted alkylene group, an arylene group, or a substituted arylene group, and (2) from about 85 to about 99 weight percent terephthalic acid or a diester thereof.

DETAILED DESCRIPTION OF THE INVENTION

The polyesters of this invention are prepared by reacting a diol component with a diacid component. The diol component utilized in preparing such copolyesters will normally be selected from the group consisting of glycols containing from 2 to 12 carbon atoms, glycol ethers containing from 4 to 12 carbon atoms, and polyether glycols having the structural formula:

wherein A is an alkylene group containing from 2 to 6 carbon atoms and wherein n is an integer from 2 to 400. Generally, such polyether glycols will have a molecular weight of 400 to about 4000.

Preferred glycols normally contain from 2 to 8 carbon atoms with preferred glycol ethers containing from 4 to 8 carbon atoms. Some representative examples of glycols that can be utilized as the diol component include ethylene glycol, 1,3-propylene glycol, 1,2-propylene glycol, 2,2,-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4,-tetramethyl-1,3-cyclobutane diol, and the like. Some representative examples of polyether glycols that can be used include polytetramethylene glycol (Polymeg TM) and polyethylene glycol (Carbowax TM). It is normally preferred for the diol component to consist essentially of ethylene glycol.

The diacid component contains from about 85 mole percent to about 99 mole percent terephthalate acid. Diesters can, of course, be utilized in the diacid component. For example, dimethyl terephthalate can be utilized instead of terephthalic acid. Accordingly, the term "diacid component" as used herein is therefore intended to include diesters.

The diacid component will also include from about 1 mole percent to about 15 mole percent of at least one imide-containing diacid monomer having the structural formula:

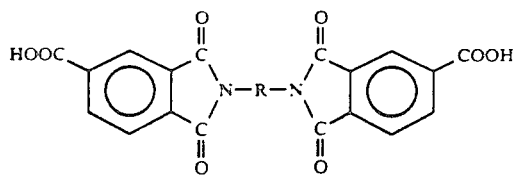

wherein R represents an alkylene group, a substituted alkylene group, an arylene group, or a substituted arylene group. It is preferred for R to have one of the following structural formulae:

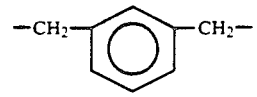 (1)

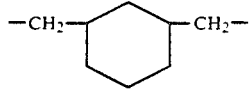 (2)

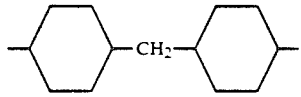 (3)

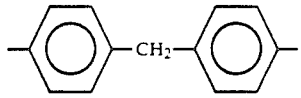 (4)

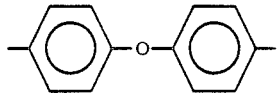 (5)

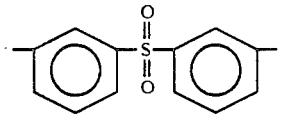 (6)

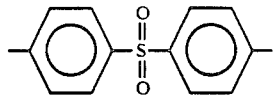 (7)

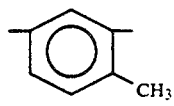 (8)

—CH₂—CH₂— (9)

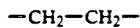

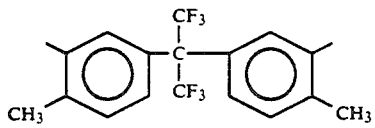 (10)

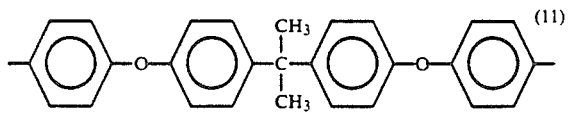 (11)

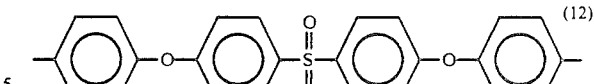 (12)

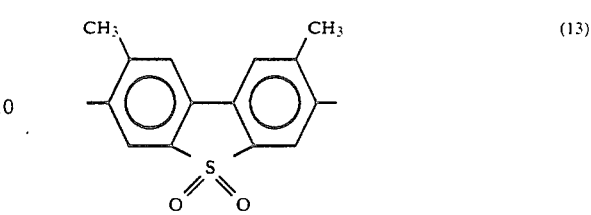 (13)

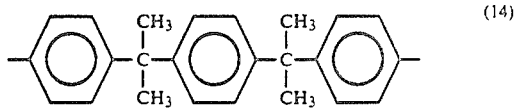 (14)

N,N'-bis(1,3-methylene)cyclohexane bis-(trimellitimide) is a highly preferred imide-containing diacid monomer which can be utilized in accordance with this invention for modifying polyesters. The amount of imide-containing diacid monomer included in the diacid component will typically be within the range of about 1 mole percent to about 15 mole percent. However, in most cases from about 2 mole percent to about 10 mole percent of the imide-containing diacid monomer will be incorporated into the diacid component. Since very small quantities of the imide-containing diacid monomer can cause the glass transition temperature of the polyester being modified to increase substantially, it is typically preferred for from about 3 mole percent to about 7 mole percent of the imide-containing diacid monomer to be utilized in the diacid component.

The diacid component can also contain minor amounts (typically less than about 2 mole percent based upon the total diacid component) of other diacid monomers. These additional diacid monomers will typically be alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain 9 to 22 carbon atoms, or diesters of alkyl substituted aryl dicarboxylic acids which contain from 11 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. The preferred diesters of alkyl dicarboxylic acids will contain from 6 to 12 carbon atoms. The preferred aryl dicarboxylic acids contain from 8 to 16 carbon atoms. Some representative examples of aryl dicarboxylic acids are isophthalic acid and orthophthalic acid. The preferred diesters of aryl dicarboxylic acids contain from 10 to 18 carbon atoms. Some representative examples of diesters of aryl dicarboxylic acids include dimethyl isophthalate, diethyl orthophthalate, dimethyl naphthalate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

In most cases the copolyesters of this invention will be synthesized by copolymerizing a monomeric mixture which consists of ethylene glycol, terephthalic acid or dimethyl terephthalate, and the imide-containing diacid monomer or diester thereof. The copolyesters of this invention can be synthesized utilizing conventional polymerization techniques which are well known in the art. Thus, conventional temperatures, catalysts, amounts of catalysts, stabilizers and the like, are used in manners well known in the literature and art. For instance, a two step process can be utilized in preparing the copolyesters of this invention. In cases where diesters are utilized as the diacid component in the first step, known as the transesterification stage, the diacid component and the diol component can be heated to a temperature which is within the range of 150° C. to about 240° C. under an inert gas atmosphere, such as nitrogen or a Noble gas. For economic reasons, nitrogen will usually be utilized. This polymerization reaction can be carried out in the presence of appropriate catalysts, such as titanium alkoxides, tetraalkyl titanium compounds, or zinc acetates. In cases where diacids are utilized as the diacid component, the diacid component and the diol component are heated to a temperature which is within the range of about 240° C. to about 290° C. at a pressure of about 10 psi (6.9×10⁴ Pa) to about 70 psi (4.8×10⁵ Pa) A catalyst is normally not utilized in such esterification steps. In the second step, the polycondensation reaction can be carried out under a reduced pressure of less than about 0.5 mm of mercury (66.7 Pascals) at a temperature which is typically in the range of about 230° C. to about 300° C. The polymerization time required will vary with the amount and type of catalyst used as well as the polymerization temperature utilized. The extent of the polycondensation will also depend somewhat on the desired molecular weight of the copolyester being synthesized. In most cases, it will be desirable for the copolyester to have an IV (intrinsic viscosity) of at least about 0.6 dl/g in a 60:40 phenol:tetrachloroethane solvent system at a temperature of 30° C. In most cases, it is preferred for the copolyester to have an IV which is within the range of about 0.7 dl/g to about 0.9 dl/g.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

A series of imide-containing diacid monomers were synthesized utilizing the general procedure described by Kricheldorf and Pakull, 21 Macromolecular 551 (1988). In the procedure utilized, 50 ml of dimethyl formamide (DMF) was added to a 250 ml 1-neck flask which had been previously oven dried. In each of the series of experiments run, 0.05 moles of the diamine listed in Table I were added to the DMF in the flask with the resulting mixture being stirred with a magnetic stirrer to give a homogeneous solution. Trimellitic anhydride (TMA) was added in small portions over a 5 minute period until 0.125 moles of the TMA had been added. Then, an additional 50 ml of DMF was added.

The TMA initially dissolved and then a large amount of a white precipitate formed which made stirring difficult. The reaction mixture was then heated to dissolve the solids and held at reflux for 3 hours. In some cases, the amic acid precipitated shortly after reflux was achieved, while in others the solution remained homogeneous throughout the 3 hours. Afterward, 0.250 moles of acetic anhydride was added to the reaction, and it was refluxed for an additional 2 hours. After cooling to room temperature, the product was precipitated into ice-water, collected by filtration, washed with water, and then dried under vacuum at 100° C. overnight. In most cases the crude yields were above 90%. The crude products were recrystallized once from either ethylene glycol or a DMF-water mixture.

The reaction used in the preparation of the imide-containing diacid monomers is as follows:

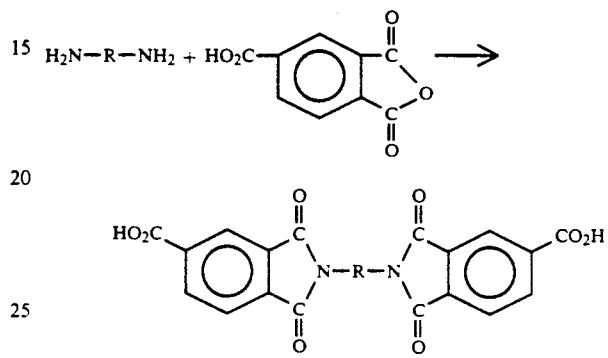

Table I shows the diamines utilized, the crude yield attained, the yield realized after crystallization, and the melting point of the imide-containing diacid monomer synthesized.

TABLE 1

| | Crude Yield (%) | Yield After Recrystallization (%) | Melting Point °C. |
|---|---|---|---|
| H₂N—CH₂—⬡—CH₂—NH₂ | 97 | 56 | 317-320 |
| H₂N—CH₂—⌬—CH₂—NH₂ | 97 | 72 | 319-329 |
| H₂N—⬡—CH₂—⬡—NH₂ | 95 | 55 | 270-278 |
| H₂N—⌬—CH₂—⌬—NH₂ | 93 | 72 | 325-333 |
| H₂N—⌬—O—⌬—NH₂ | 96 | 57 | 328-332 |
| H₂N—⌬—S(O)(O)—⌬—NH₂ | 67 | 42 | 360-364 |
| H₂N—⌬—S(O)(O)—⌬—NH₂ | 93 | 50 | 337-343 |
| H₂N,NH₂ / CH₃ | 90 | — | 337-344 |

TABLE 1-continued

| | Crude Yield (%) | Yield After Recrystallization (%) | Melting Point °C. |
|---|---|---|---|
| $H_2N-CH_2CH_2-NH_2$ | 90 | 64 | 341-347 |

The imide-containing diacid monomers were then utilized in the synthesis of copolyesters having increased glass transition temperatures. In the procedures used polyethylene terephthalate oligomer was prepared by reacting terephthalic acid with ethylene glycol at a temperature of 280° C. and a pressure of 35 pounds per square inch (2.41 × 10$^5$ Pascals). The polyethylene terephthalate oligomer (PET heel) prepared had an average degree of polymerization of about 5.

The PET heel and the various imide-containing diacid monomers were charged into a glass polymerization reactor. All of the polymerizations were conducted in the presence of 210 ppm of antimony (as antimony trioxide) and 20 ppm of phosphorus (as triethylene glycol diphosphite). The mixture in the reactor was heated to a temperature of 260° C. and stirred under a nitrogen atmosphere for 30 minutes. The pressure was then reduced to less than about 1 mm of mercury (133 Pascals) with the temperature being increased to 280° C. and the polymerization was continued for 2 additional hours. The polymers produced were then discharged from the reactor and their glass transition temperatures, intrinsic viscosities, and melting points were determined. These results are reported in Table II.

A control experiment was also conducted wherein no imide-containing diacid monomer was utilized as a monomer in the polymerization. In other words, unmodified polyethylene terephthalate was made in the control experiment. The polyethylene terephthalate made in the control experiment was determined to have a glass transition temperature of 74° C.

TABLE II

| Structure | Amount Mole % | IV | Tg (°C.) Onset | Tm (°C.) | Color | Deg % |
|---|---|---|---|---|---|---|
| PET | — | 0.52 | 74.0 | 255.3 | White | 1.98 |
| $-CH_2-$(cyclohexane)$-CH_2-$ | 2.5 | 0.57 | 75.5 | 248.1 | Yellow | 1.85 |
| $-CH_2-$(cyclohexane)$-CH_2-$ | 5.0 | 0.55 | 80.2 | 242.4 | Yellow | 1.75 |
| $-CH_2-$(benzene)$-CH_2-$ | 5.0 | 0.54 | 78.1 | 242.0 | Brown | — |
| (cyclohexyl)$-CH_2-$(cyclohexyl) | 2.5 | 0.60 | 76.2 | 246.9 | Brown | — |
| (phenyl)$-CH_2-$(phenyl) | 2.5 | 0.64 | 76.9 | 245.3 | Brown | — |
| (phenyl)$-O-$(phenyl) | 2.5 | 0.55 | 76.1 | 244.9 | Brown | — |
| (phenyl)$-S(=O)_2-$(phenyl) | 2.5 | 0.60 | 78.5 | 245.3 | Brown | — |
| (phenyl)$-S(=O)_2-$(phenyl) | 2.5 | 0.59 | 78.4 | 247.9 | Brown | 1.82 |

TABLE II-continued

| Structure | Amount Mole % | IV | Tg (°C.) Onset | Tm (°C.) | Color | Deg % |
|---|---|---|---|---|---|---|
|  | 2.5 | 0.52 | 77.2 | 246.6 | Brown | — |
| —CH$_2$CH$_2$— | 5.0 | 0.52 | 79.5 | 242.9 | Brown | — |
| 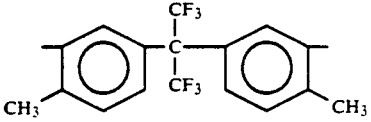 | 5.0 | 0.49 | 88.2 | 233.9 | Yellow | |
| 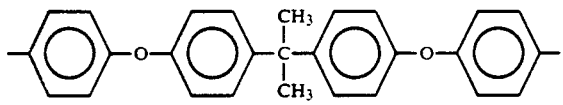 | 5.0 | 0.56 | 85.3 | 233.1 | Brown | |
| 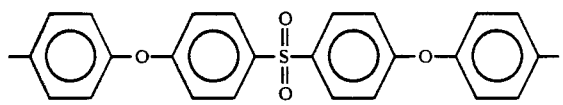 | 5.0 | 0.56 | 86.9 | 232.7 | Brown | |
| 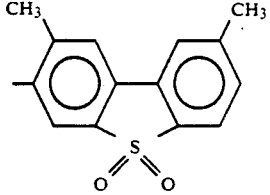 | 5.0 | 0.44 | 87.5 | 235.1 | Brown | |
| 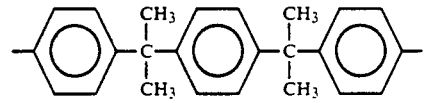 | 5.0 | 0.51 | 84.3 | 234.2 | Brown | |

As can be seen from Table II, all of the copolyesters made utilizing imide-containing diacid monomers had glass transition temperatures which are above the glass transition temperature of PET (74° C.). Thus, this experiment shows that PET which is modified with a small amount of imide-containing diacid monomer has an elevated glass transition temperature. The copolyester made utilizing 5 mole percent (13.4 weight percent) N,N'-bis(1,3-methylene)cyclohexane bis-(trimellitimide) in its diacid component had a particularly high glass transition temperature of 80.2° C. It is accordingly possible to make articles with such modified PET that are thermally stable to at least about 80.2° C. without the need for heat-setting. By utilizing heat-setting techniques, the service temperatures of such articles can be increased to even higher temperatures. In a larger scale synthesis (about 20 pound batches), this copolymer was synthesized and solid state polymerized to an IV of 0.79 dl/g. The copolyester was determined to have a glass transition temperature of 84.4° C. PET homopolymer having an IV of 0.80 dl/g was determined to have a glass transition temperature of 76.3° C. Thus, the modified polyester had a glass transition temperature which was about 8.1° C. higher than the PET homopolymer.

The copolyesters made with N,N'-bis(1,3-methylene) cyclohexane bis-(trimellitimide) were significantly lighter in color than any of the other copolyesters. In addition, a DSC thermogram showed that the copolyester was capable of crystallizing. Surprisingly, it was also found that the copolyester made utilizing N,N'-bis(1,3-methylene) cyclohexane bis-(trimellitimide) had a DEG level which was somewhat lower than that of the PET control.

Since PET resins which are modified with N,N'-bis(1,3-methylene)cyclohexane bis-(trimellitimide) are yellow in color, it may be desirable to add various pigments to the resin to attain a desirable color. For example, blue pigment, red pigment, and optionally yellow pigment can be added to the resin in appropriate amounts to produce an aesthetically pleasing amber color. Phthalocyanine blue, Solvaperm Yellow G (CAS No. 10319-14-9) and Solvaperm Red G (also designated as Solvent Red 135) are examples of preferred pigments which can be employed. U.S. Pat. No. 4,654,399 to Callander, the teachings of which are incorporated herein, provides a more detailed description on a technique for producing amber colored resin.

EXAMPLE 2

In this experiment N,N'-bis(1,3-methylene) cyclohexane bis(trimellitimide) was synthesized employing a preferred technique. A Pfaudler glass lined 30 gallon (114 liter) reactor was utilized in the synthesis. To remove moisture, the reactor was placed under full vacuum and heated to 100° C. Vacuum was broken with nitrogen and the procedure was repeated three times.

The reactor was charged with 175 lbs. (79.4 kg) glacial acetic acid and 42 lbs. (19 kg) of trimellitic anhydride. Heating and agitation of the reactor contents was begun. The reactor was heated to, and controlled at, 90° C. 15 lbs (6.8 kg) of 1,3-bis(aminomethyl)cyclohexane were charged over a 5 minute period. The rates of the 1,3-bis(aminomethyl) cyclohexane addition and the cooling water flow to the jacket, were used to control the exotherm and keep the temperature between 90°-100° C. Once the 1,3-bis(aminomethyl)cyclohexane addition was complete, the contents were allowed to react at 95° C. for 4 hours. The reactor was then cooled to 30° C. and allowed to agitate overnight.

The reactor contents were initially pressured to a 12 tray Sparkler Filter. Pumping of the material to the filter began after the filter paper was wetted (approximately 10 minutes). When the reactor was nearly empty, an additional 20 gallons (75.7 liters) of water was charged so that there was ample material to recycle through the filter and back to the reactor. The filtrate was recycled for ½ hour and then pumped to a drum. Next, the cake was washed with tap water until a filtrate pH of 4 was obtained. The cake was purged with nitrogen for 1 hour and the product removed from the filter.

A 93.5 lbs. (42.4 kg) sample of crude N,N'-bis(1,3-methylene)cyclohexane bis(trimellitimide) containing 55.4% volatiles was recovered. This represented a 82.3% yield based on 1,3-bis(aminomethyl) cyclohexane charged. The product was white in color and found by NMR analysis to be of high purity. This experiment shows that N,N'-bis(1,3-methylene) cyclohexane bis(trimellitimide) monomer can be synthesized by a commercially feasible process which utilizes acetic acid as the solvent.

While certain representative embodiments have been shown for the purpose of illustrating the present invention, it will be apparent to those skilled in this art that various changes and modifications can be made therein without departing from the scope of the present invention.

What is claimed is:

1. A process for preparing a copolyester having a high glass transition temperature which comprises copolymerizing (a) a diol component which consists essentially of ethylene glycol and (b) a diacid component which consists essentially of (1) from about 1 to about 15 weight percent N,N'-bis(1,3-methylene)cyclohexane bis-(trimellitimide) and (2) from about 85 to about 99 weight percent terephthalic acid or a diester thereof.

2. A copolyester which consists essentially of repeat units which are derived from (a) a diol component which consists essentially of ethylene glycol and (b) a diacid component which consists essentially of (1) from about 1 from about 1 to about 15 mole percent N,N'-bis(1,3-methylene)cyclohexane bis(trimellitimide) and from about 85 to about 99 mole percent terephthalic acid or a diester thereof.

3. A copolyester as specified in claim 2 wherein the diacid component contains from about 2 mole percent to about 10 mole percent N,N'-bis(1,3-methylene) cyclohexane bis(trimellitimide).

4. A copolyester as specified in claim 2 wherein the diacid component contains from about 3 mole percent to 7 mole percent N,N'-bis(1,3-methylene)cyclohexane bis(trimellitimide).

5. An article which is comprised of the copolyester specified in claim 2.

6. A container which is comprised of the copolyester specified in claim 3.

7. A container as specified in claim 6 wherein the container is heat-set.

8. A container as specified in claim 6 wherein the container is a member selected from the group consisting of bottles, jars and cans.

9. A process as specified in claim 1 wherein the copolymerization is conducted utilizing a two step process consisting of an esterification stage or a transesterification stage and a polycondensation stage.

10. A process as specified in claim 9 wherein the N,N'-bis(1,3-methylene) cyclohexane bis(trimellitimide) monomer is added to polyethylene terephthalate.

11. A process as specified in claim 9 wherein the first stage is a transesterification stage which is conducted at a temperature within the range of about 150° C. to about 240° C. under an inert gas atmosphere and wherein the polycondensation stage is conducted at a temperature within the range of about 230° C. to about 300° C. under reduced pressure.

12. A process as specified in claim 9 wherein the first stage is an esterification stage which is conducted at a temperature which is within the range of about 240° C. to about 290° C. at a pressure which is within the range of about $6.9 \times 10^4$ Pa to about $4.8 \times 10^5$ Pa and wherein the polycondensation stage is conducted at a temperature within the range of about 230° C. to about 300° C. under reduced pressure.

* * * * *